INVENTOR.
WILLIAM R. BRATSCHUN
BY Charles J. Ungemach
ATTORNEY

INVENTOR.
WILLIAM R. BRATSCHUN
BY Charles J. Ungemach
ATTORNEY 3,344,073

PROCESS FOR OPTIONIZING ELECTRICAL AND PHYSICAL CHARACTERISTICS OF FERROELECTRIC MATERIALS

William R. Bratschun, Minnetonka, Minn., assignor to Honeywell Inc., Minneapolis, Minn., a corporation of Delaware Filed Nov. 18, 1964, Ser. No. 412,149
7 Claims. (Cl. 252—62.9)

ABSTRACT OF THE DISCLOSURE

An improved method for optimizing the electrical and physical characteristics of lead zirconate-lead titanate material. This is accomplished by first firing the ceramic composition at a first elevated temperature under normal atmospheric pressure and then refiring the ceramic composition at a higher temperature under a greater than normal atmospheric pressure.

This invention relates generally to an improved method of forming high density ferroelectric ceramics, and more particularly relates to a method of forming high density piezoelectric lead zirconate-lead titanate compositions by refiring the material under a relatively high isostatic pressure.

The fact that certain solid solutions of lead zirconate and lead titanate could be used in piezoelectric transducers was initially discovered by Bernard Jaffe. The Jaffe Patent 2,708,244 that issued May 10, 1955, sets forth the basic technique of preparing this type of ferroelectric ceramic. Since that time, much effort has been expended to improve the mechanical and electrical properties of this material. For example, my co-pending application, Ser. No. 247,211, filed Dec. 26, 1962, now Patent 3,194,-765, entitled "Ferroelectric Ceramics," and assigned to the same assignee as the present invention, describes a lead zirconate-lead titanate composition including certain specific quantities of cadmium oxide substituted for a portion of the lead oxide in lead zirconate-lead titanate compositions. In addition, my co-pending application, Ser. No. 342,890, filed Feb. 6, 1964, now Patent 3,303,133, entitled "Ferroelectric Process," assigned to the same assignee, describes a process in which the lead zirconate-lead titanate composition is fired in a cadmium oxide atmosphere to improve the density of the material.

I have discovered by further investigation that the density of lead zirconate-lead titanate compositions can be increased without losing desirable electrical properties by refiring the material in the presence of a suitable gas maintained at a relatively high pressure.

The objects and advantages of the present invention can best be discovered from a study of the following specification and drawings, in which.

Figure 1:
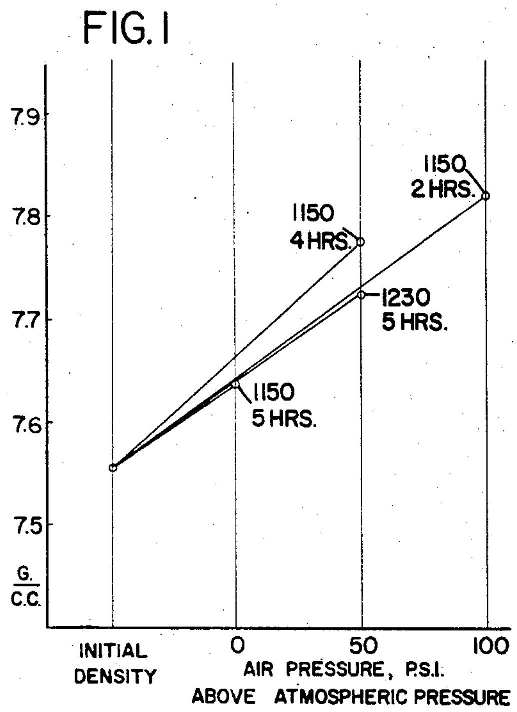
FIGURE 1 is a plot of density versus air pressure of samples of a first type of lead zirconate-lead titanate material prepared according to prior art methods and then subjected to further firing at various temperatures and pressures according to this invention.

All of the samples mentioned as being used to obtain the data presented in FIGURES 1–5 were initially prepared according to prior art techniques and then treated according to the present invention. Tabulated below are the three above mentioned sample compositions, the first two of which have been used commercially when prepared according to prior art techniques.

TABLE A

Type I (FIGURE 1) $Pb(Zr_{0.53}Ti_{0.47})O_3+0.0123PbNb_2O_6$

Type II (FIGURE 2) $(Pb_{0.94}Sr_{0.06})(Zr_{0.53}Ti_{0.47})O_3$

Type III (FIGURES 3, 4 and 5), $(Pb_{0.985}Cd_{0.015})(Zr_{0.53}Ti_{0.47})O_3$

While the discussion of the invention will be limited to these materials, it should be appreciated that the invention is equally applicable to other formulations of solid solutions of lead zirconate and lead titanate wherein the atomic ratio of Zr to Ti is from 90:10 to 40:60. The invention is also applicable to the lead titanate-lead zirconate-lead stannate compositions of the type disclosed in Research Paper 2626 by Jaffe, Roth and Marzullo, entitled "Properties of Piezoelectric Ceramics in Solid-Solution Series Lead Titanate-Lead Zirconate-Lead Oxide: Tin Oxide and Lead Titanate-Lead Hafnate," published in the Journal of Research of the National Bureau of Standards, vol. 55, No. 5, November 1955, pp. 239–254.

The samples used to obtain the information disclosed in FIGURES 1–5 were prepared according to conventional techniques. The proper quantities of the respective ingredients were blended as oxides, calcined at 900° C., reground, and pressed into the desired shapes. They were then fired at a high temperature in enclosed magnesia crucibles with a lead oxide atmosphere at atmospheric pressure. The resulting samples, at the "initial densities" shown in FIGURES 1–5, were then refired under the pressure and temperature conditions shown.

This invention can best be explained if it is considered in connection with the problems that it helped to solve. After the sintering of Type III material according to prior art techniques, it was observed that maximum density was achieved at a firing temperature of approximately 1000° C. Maximum density is a desirable quality since it increases the dynamic strength of the ceramic, and can improve dielectric and piezoelectric properties. For samples fired at 1230° C., it was observed that the density was reduced considerably and that the material was difficult to polarize. The material fired at the higher temperature, however, exhibited a higher dielectric constant and a lower dissipation factor than the material fired at the lower temperature. In short, it was desirable to fire at the lower temperature to obtain good mechanical qualities, and at the higher temperature to obtain good electrical qualities. The prior art solution was to compromise and fire at an intermediate temperature at which none of the above qualities was optimized. At the intermediate temperature, the density was lower than optimum, the dielectric constant was lower than optimum, and the dissipation factor was higher than would be desirable.

The following properties were exhibited by Type III materials after being prepared by prior art techniques at the firing temperatures indicated. The values given are average values compiled from a number of firings. Individual samples will vary from the average values given.

TABLE B

| | 1,000° C. | 1,230° C. |
|---|---|---|
| Density (gm./cc.) | 7.75–7.80 | 7.50–7.55 |
| Dielectric constant | 1,100 | 1,300 |
| Parallel strain coefficient (m./v.) | $230\times10^{-12}$ | $290\times10^{-12}$ |
| Poling voltage (v./mil.) | 110 | 70–75 |

It can be seen that the density of the material fired at 1000° C. was better than for the material fired at 1230° C. while the reverse was true for the electrical properties.

Figure 6:
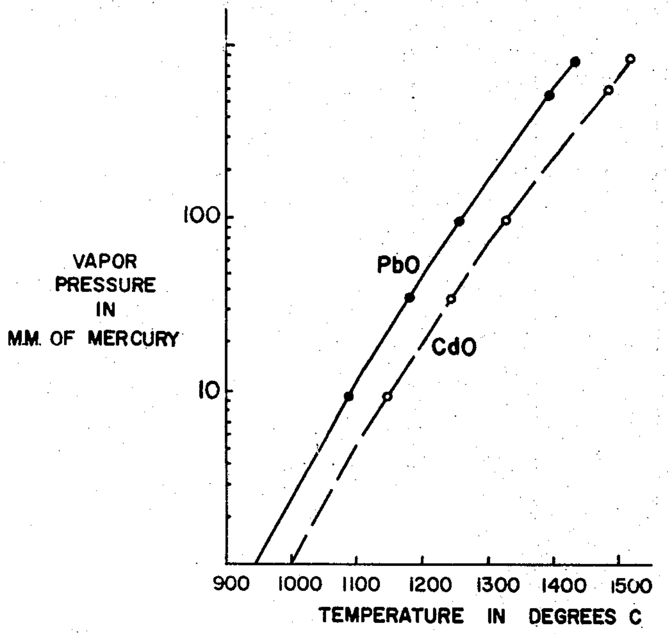
FIGURE 6 is a plot of vapor pressure versus temperature for lead oxide and cadmium oxide.

The undesirable decrease in density as the firing temperature was increased appeared to be caused by a bloating process. When the prefired ceramic material is reground into a powder and then pressed into the desired shape, a certain amount of air and other gases is always entrapped in the pores of the material. As the temperature of the material is raised during firing, the entrapped gas expands in accordance with the well known gas laws. The gaseous PbO or CdO in equilibrium with the ceramic also increases in pressure as disclosed in FIGURE 6. Since the ceramic material becomes slightly plastic at high temperature (above 815° C. for Type III material, for example) the increase in gaseous pressure within the pores causes a bloating process to occur that reduces the density of the material.

At the present stage of development of piezoelectric lead zirconate-lead titanate ceramics, there are two methods available for sintering the material to obtain useful densities. These are sagger firing and hot pressing. The sagger firing is done under normal atmospheric pressure conditions, at high temperatures, and in the presence of gaseous PbO. The sagger firing technique was used in preparing the samples set forth in Table A. Again, there is no single temperature at which both the mechanical and electrical properties of the material can be optimized. For each of the three compositions shown, there is one temperature at which the mechanical properties can be optimized using conventional techniques, and another higher temperature at which electrical properties can be optimized.

The other method of achieving high density, the hot pressing technique, involves the use of a die to maintain the ceramic under a high pressure as it is being fired. There are several reasons why the usefulness of the hot pressing technique is limited. The technique is expensive since a single die will withstand only a few firings before deteriorating under the effects of the high temperatures and pressures which are used. The technique is especially impractical in the case of very large samples because of the prohibitive cost of the die. Further, it is impossible to hot press other than simple shapes. A die cannot be built to accommodate a sample having an intricate physical shape. Chemical interaction between the die material and the ceramic material being pressed is also a problem. Nevertheless, the hot pressing technique results in a ceramic that is superior to sagger fired ceramics with respect to density, control of electrical properties, dielectric strength and mechanical strength. For further information on the comparison of hot pressed and sagger-fired ceramics, see "Factors Affecting Lead Zirconate-Lead Titanate Ceramics" by Peter D. Levett in the Bulletin of the American Ceramic Society, volume 42, #6, pp. 348–52, 1963.

The present invention provides a method of obtaining ceramics having the superior properties of hot pressed ceramics, while using the basic sagger firing techniques. This unique method first involves preparing the lead zirconate-lead titanate samples in accordance with present techniques to obtain either maximum density or optimum electrical properties at a reduced density. As previously noted, the temperature at which maximum density is achieved is lower than the temperature that is required to obtain optimum electrical properties. After maximum density is achieved using present techniques, the environmental air pressure or other gas pressure is increased according to this invention to a sufficient degree to prevent bloating at the temperature that is necessary to achieve optimum electrical properties. If, in the first firing, the temperature is raised sufficiently to optimize electrical properties, the refiring under pressure is used to increase the density to a higher level. With a sufficiently high isostatic pressure applied, the density of the sample can be maintained or even increased as the temperature is raised.

To obtain the data set forth in FIGURES 1–5, prefired slugs of various compositions, densities, and previous thermal histories were subjected to an additional 0, 50 or 100 p.s.i. air pressurized heat treatment. The density both before and after the pressurized heat treatment could therefore be recorded.

The necessary pressures were obtained by placing the samples in a pressurized ceramic tube having an O-ring seal on each end. An air supply and a pressure control system were connected to the tube so that the desired pressure could be maintained within the tube surrounding the samples. The ceramic tube was placed in a standard furnace and thereby heated to a selected temperature while the selected pressure was maintained. It should be noted that the particular mechanism used to achieve the high isostatic gas pressure environment is not critical to this invention. A pressurized steel shell surrounding the furnace, for example, would afford a means of achieving the same or higher pressures than those used to obtain the data disclosed herein.

With reference to FIGURES 1–5, the following chart discloses the previous thermal histories of the samples used to obtain the data disclosed. The samples of the Type I and II materials were taken from production lots being prepared for commercial use.

TABLE C

Figure 2:
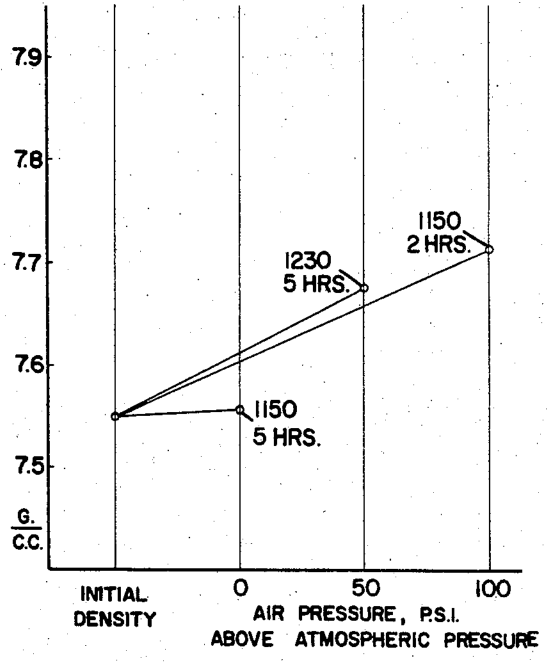
FIGURE 2 is a plot of density versus air pressure of a second type of material process in a manner similar to that disclosed in FIGURE 1.
Figure 3:
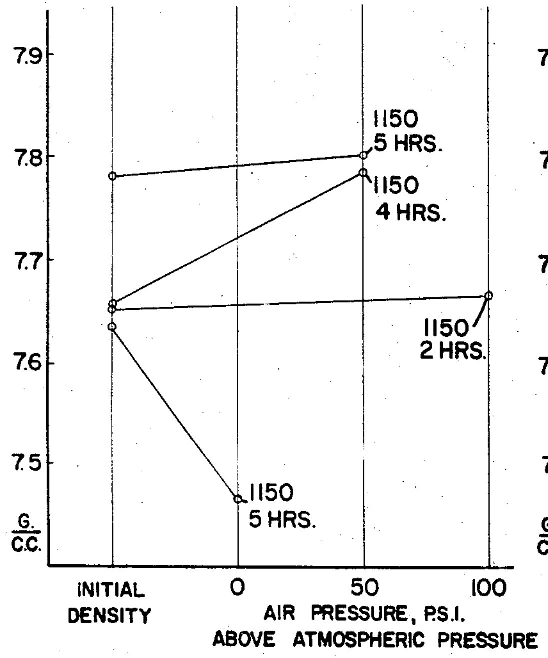
FIGURE 3 is a plot of density versus air pressure of a third type of material processed in a manner similar to that disclosed in FIGURES 1 and 2.
Figure 4:
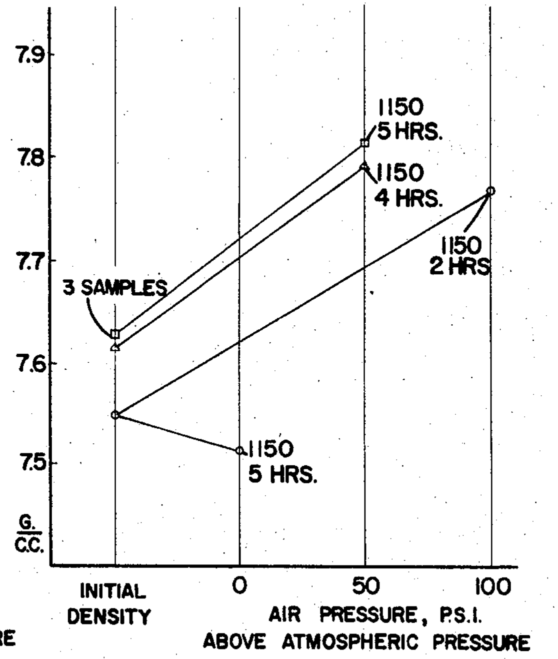
FIGURE 4 is a plot of density versus air pressure of samples of the third type of material processed under different conditions than those used for the samples of FIGURE 3.

FIGURE 1—Type I material—Fired at 1290° C. for 45 minutes.
FIGURE 2—Type II material—Fired at 1330° C. for 2 hours.
FIGURE 3—Type III material—Fired at 1000° C. for 5 hours.
FIGURE 4—Type III material—
- Code ○ fired at 880° C. for 5 hours and at 1250° C. for 5 hours.
- Code △ fired at 880° C. for 5 hours and at 1230° C. for 5 hours.
- Code □ fired at 980° C. for 5 hours and at 1230° C. for 5 hours.

Figure 5:
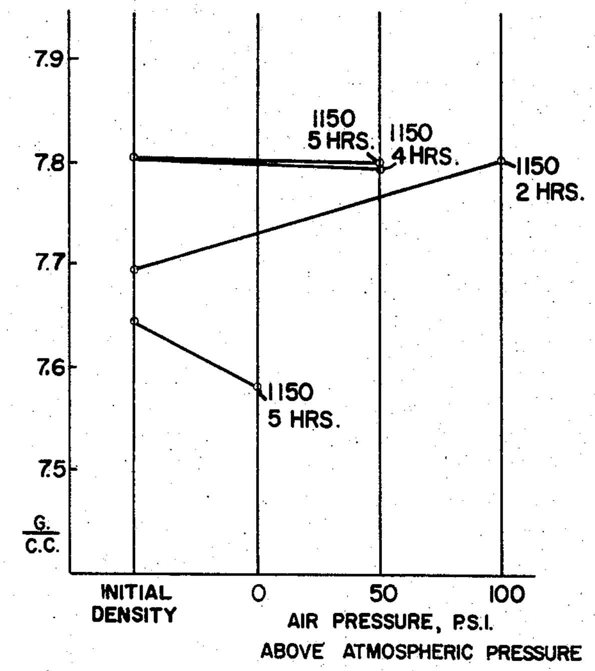
FIGURE 5 is a plot of density versus air pressure of samples of the third type of material processed under different conditions than those used for the samples of FIGURES 3 and 4.

FIGURE 5—Type III material—Fired at 1150° C. for 5 hours.

FIGURE 1 discloses the results of refiring four samples of Type I material having an initial density of 7.556. One control sample fired at 1150° C. for 5 hours at 0 p.s.i. showed a recognizable increase in density. The two samples fired at 1150° C. and 1230° C. at a pressure of 50 p.s.i. showed a significant increase in density, while the greatest increase in density occurred in the sample that was fired for two hours at 1150° C. and 100 p.s.i. If the three samples that were refired at 1150° C. are compared, it can be seen that the density increases significantly with each increase in the isostatic air pressure environment during refiring.

In FIGURE 2, the results of refiring four samples of Type II material are disclosed. The refire at 0 p.s.i. showed no significant change in density for this material. The refirings of the two samples at 50 p.s.i. and the one sample at 100 p.s.i. again showed significant increases in density.

The samples of the Type III material tested to obtain the data disclosed in FIGURE 3 were originally fired at 0 p.s.i. for 5 hours at 1000° C. The control sample that was refired at 0 p.s.i. for 5 hours at 1150° C. showed a marked decrease in density. The two samples that were fired at 50 p.s.i. both increased in density while the sample fired at 100 p.s.i. increased slightly in density. All of the samples here were refired at 1150° C. It is especially significant to note the fact of the great decrease in density of the sample fired at 0 p.s.i. as compared to the fact that all samples fired at a higher pressure either maintained their original density or increased in density.

In FIGURE 4, there is disclosed the results of refiring six samples of Type III material having different prior thermal histories as disclosed in Table C. Again, the control sample decreased in density when refired at 1150° C. and 0 p.s.i. The other samples all showed significant increases in density when refired under pressure.

FIGURE 5 discloses the result of refiring four samples of Type III material that were originally fired for 5 hours at 1150° C. The control sample again decreased significantly in density when refired at 0 p.s.i. and 1150° C. The sample with an original density of 7.697 increased in density when refired for 2 hours at 100 p.s.i. and 1150° C. The two samples having an initial very high density of 7.805 effectively retained this high density when refired at 1150° C. and 50 p.s.i.

As disclosed in Table D below, several specimens for each sample of Type I material were tested to obtain dielectric and piezoelectric data after (1) normal production sintering, and (2) after a resintering under air pressure according to this invention. The samples used had an initial density of 7.556 and were originally fired at 1290° C. for 45 minutes.

TABLE D

| Sample | Additional Treatment | | | Density | Unpoled Properties | | Properties 24 Hours After Polarization | | |
|---|---|---|---|---|---|---|---|---|---|
| | Temp., ° C. | Time, Hrs. | Pressure | | Dielectric Constant | Dissipation Factor | Dielectric Constant | Dissipation Factor | Radial Coupling Coefficient |
| 1 | No additional treatment | | | 7.556 | 1,185 | 0.019 | 1,625 | 0.018 | 0.56 |
| 2 | 1,150 | 5 | 50 | 7.779 | 1,220 | 0.019 | 1,633 | 0.019 | 0.56 |

As disclosed in Table D, the production sintered material (Sample 1) has a high poled dielectric constant and radial coupling coefficient. This was expected since the production process used was specifically developed to optimize these properties. A significant change in properties occurred, however, in Sample 2 where the material was resintered at 50 p.s.i. above atmosphreic pressure. A substantial increase occurred in density and unpoled dielectric constant while the poled dielectric constant and radial coupling coefficient were comparable to productiotn sintered Sample 1. This data establishes the fact that it is possible to increase density by pressurized sintering and still maintain or improve desirable dielectric and piezoelectric properties.

The pressurized refiring of lead zirconate-lead titanate materials according to this invention was carried out in an air atmosphere. The test established that pressurized sintering increases densities of three different compositions at pressures as low as 50 p.s.i. An air atmosphere was selected for these tests since it was readily available and would simplify the test apparatus. Since air is composed of a large number of different types of gases, it follows that any detrimental effect that such gases would have had on the material would have come to light under the high temperature-high pressure conditions to which the materials were subjected. One such detrimental effect was noted in the case of the Type III material. At 1230° C. and 50 p.s.i. air pressure, it is believed some absorption of oxygen ions from the air by the lead zirconate-lead titanate material and the coincident expulsion of $Cd^{2+}$ and $Pb^{2+}$ ions from the structure were noted. This resulted in decreased density, dielectric, and piezoelectric properties. Such effects could be eliminated by regulating the type of atmosphere in which the material is refired. In general, the type of gas required for pressurizing is believed to be one having a high molecular weight so that it will not readily diffuse into the material, and one that will not react chemically with the material being sintered. Since air is about 70% nitrogen and the tests did not indicate any adverse effects on the material caused by the nitrogen it would appear that nitrogen would meet the above criteria. An inert gas such as Argon would also meet such criteria.

While the invention has been described in detail, such detail should not be considered a limitation, the scope of the invention being defined in the appended claims.

I claim:

1. A method of producing improved ceramic bodies comprising solid solutions of lead titanate and lead zirconate in which the atomic ratio of Zr to Ti is from 90:10 to 40:60 which includes preparing a mixture of PbO, $ZrO_2$ and $TiO_2$ in requisite proportions to produce the said solutions of lead titanate and lead zirconate, forming said mixture into a body of desired shape, firing said mixture under atmospheric pressure conditions at a first elevated temperature to densify said mixture, and refiring said mixture at a second elevated temperature higher than said first temperature while maintaining an isostatic air pressure environment greater than the atmospheric pressure around said mixture.

2. A method of preparing a dense ceramic of lead zirconate-lead titanate which comprises preparing a mixture of lead zirconate-lead titanate wherein the atomic ratio of Zr to Ti is from 90:10 to 40:60, forming said mixture into a desired shape, firing said mixture at substantially atmospheric pressure at a temperature in excess of 880° C. to densify said mixture, and refiring said densified mixture at a temperature in excess of 1100° C. while maintaining said mixture under an elevated isostatic air pressure higher than atmospheric pressure.

3. A method of preparing a dense ceramic of lead zirconate-lead titanate which comprises preparing a mixture of lead zirconate-lead titanate wherein the atomic ratio of Zr to Ti is from 90:10 to 40:60, forming said mixture into a desired shape, firing said mixture under atmospheric pressure conditions at approximately 1000° C. to obtain maximum density at said atmospheric pressure, and refiring said mixture at a temperature of about 1150° to 1250° C. while maintaining said mixture under an isostatic air pressure of about 50 to 100 pounds per square inch.

4. A method of producing a dense ceramic having the empirical formula $(Pb_{.94}Sr_{.06})(Zr_{.53}Ti_{.47})O_3$ comprising preparing a mixture of PbO, $ZrO_2$, SrO, and $TiO_2$ in amounts to provide the composition of said formula, calcining said material to react the constituents, grinding said mixture, pressing said mixture into the desired shape, firing said mixture at substantially atmospheric pressure at a temperature in excess of 980° C. to densify said mixture, and refiring said mixture at a temperature in excess of 1100° C. while maintaining an isostatic air pressure of at least 50 p.s.i. on said mixture.

5. The method of producing a dense ceramic of lead zirconate-lead titanate doped by the addition of lead niobate comprising preparing a mixture of PbO, $ZrO_2$, $TiO_2$, and $Nb_2O_5$ to provide a mixture having the empirical formula $Pb(Zr_{.53}Ti_{.47})O_3+.0123PbNb_2O_6$, calcining said mixture to react the constituents, firing said mixture under atmospheric pressure conditions at a temperature in excess of 980° C. to densify said mixture, and refiring said mixture at a temperature in excess of 1100° C. while maintaining said mixture under an isostatic air pressure of at least 50 p.s.i.

6. A method of preparing a dense ceramic having the empirical formula $(Pb_{.985}Cd_{.015})(Zr_{.53}Ti_{.47})O_3$ comprising preparing a mixture of the oxides of the constituents thereof in the proper amounts to provide the composition of said formula, forming said mixture into the desired shape, firing said mixture under atmospheric pressure conditions at a first temperature of at least 880° C. to densify said mixture, and refiring said mixture at a second temperature higher than said first temperature in a high pressure air environment to maintain or increase the density of said mixture while improving the electrical properties thereof.

7. A method of producing a dense ceramic of lead zirconate-lead titanate which comprises preparing a mixture of lead zirconate-lead titanate wherein the atomic ratio of Zr to Ti is from 90:10 to 40:60, forming said mixture into a desired shape, firing said mixture at a first elevated temperature under normal atmospheric pressure conditions to obtain optimum electrical properties, and refiring said mixture in a high isostatic gas pressure environment at a second elevated temperature higher than said first temperature to increase the density thereof.

References Cited

UNITED STATES PATENTS

| | | | |
|---|---|---|---|
| 2,742,370 | 4/1950 | Wainer | 106—39 |
| 2,956,327 | 10/1960 | Borel et al. | 252—62.9 |
| 3,216,943 | 11/1965 | Jaffe et al. | 252—62.9 |

TOBIAS E. LEVOW, *Primary Examiner.*

R. D. EDMONDS, *Assistant Examiner.*